(12) United States Patent
Suzuki et al.

(10) Patent No.: US 10,789,845 B2
(45) Date of Patent: Sep. 29, 2020

(54) PARKING ASSISTANCE METHOD AND PARKING ASSISTANCE DEVICE

(71) Applicant: Nissan Motor Co., Ltd., Yokohama-shi, Kanagawa (JP)

(72) Inventors: Yasuhiro Suzuki, Kanagawa (JP); Ko Sato, Kanagawa (JP); Daisuke Tanaka, Kanagawa (JP); Yasuhiro Sakurai, Kanagawa (JP); Ryota Yamanaka, Kanagawa (JP); Junya Kobayashi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/627,159

(22) PCT Filed: Jul. 7, 2017

(86) PCT No.: PCT/JP2017/025012
§ 371 (c)(1),
(2) Date: Dec. 27, 2019

(87) PCT Pub. No.: WO2019/008764
PCT Pub. Date: Jan. 10, 2019

(65) Prior Publication Data
US 2020/0226926 A1    Jul. 16, 2020

(51) Int. Cl.
*G08G 1/14*    (2006.01)
*B60W 30/06*   (2006.01)
*B60W 50/14*   (2020.01)

(52) U.S. Cl.
CPC ............ *G08G 1/143* (2013.01); *B60W 30/06* (2013.01); *B60W 50/14* (2013.01); *B60W 2050/146* (2013.01); *B60W 2540/215* (2020.02)

(58) Field of Classification Search
CPC ..... B60W 2050/146; B60W 2540/215; B60W 30/06; B60W 50/14; G08G 1/143
See application file for complete search history.

(56) References Cited

U.S. PATENT DOCUMENTS 9,520,063 B2 * 12/2016 Noh ................. G08G 1/147
10,578,676 B2 * 3/2020 Neubecker ........... G06F 1/3215
(Continued)

FOREIGN PATENT DOCUMENTS

| CA | 3002638 A1 | 4/2017 |
|---|---|---|
| DE | 102009046726 A1 | 5/2011 |

(Continued)

*Primary Examiner* — Babar Sarwar
(74) *Attorney, Agent, or Firm* — Young Basile Hanlon & MacFarlane, P.C.

(57) ABSTRACT

A parking assistance method of the present invention includes detecting an empty parking space around a moving object, displaying a first assistance image indicating a position of the empty parking space on a surrounding image viewed from above the moving object, and setting a parking target using the displayed first assistance image. The parking assistance method includes: determining whether the detected empty parking space meets a display condition for displaying the first assistance image; and displaying the first assistance image in the empty parking space not meeting the display condition when a currently set mode is an adjustable mode that allows an occupant of the moving object to manually adjust the parking target.

9 Claims, 7 Drawing Sheets

(56) References Cited

U.S. PATENT DOCUMENTS

| | | | |
|---|---|---|---|
| 10,583,830 B2* | 3/2020 | Lavoie | G05D 1/0016 |
| 10,585,431 B2* | 3/2020 | Golgiri | H04W 4/40 |
| 10,683,034 B2* | 6/2020 | Lavoie | B60Q 9/006 |
| 10,688,918 B2* | 6/2020 | Elangovan | B60W 30/06 |
| 2011/0301786 A1* | 12/2011 | Allis | G05D 1/0011 |
| | | | 701/2 |
| 2014/0244070 A1* | 8/2014 | Inagaki | B62D 15/0285 |
| | | | 701/1 |
| 2014/0292541 A1* | 10/2014 | Korman | H04W 4/029 |
| | | | 340/932.2 |
| 2016/0284217 A1* | 9/2016 | Lee | B60K 35/00 |
| 2018/0144566 A1* | 5/2018 | Ohshima | H04W 12/08 |
| 2018/0322349 A1* | 11/2018 | Hayakawa | G06K 9/00825 |
| 2019/0064822 A1* | 2/2019 | Gorg | G05D 1/0016 |
| 2019/0163186 A1* | 5/2019 | Yoon | G08C 17/00 |
| 2019/0202447 A1* | 7/2019 | Taniguchi | G05D 1/0022 |
| 2020/0189570 A1* | 6/2020 | Yamanaka | G08G 1/144 |

FOREIGN PATENT DOCUMENTS

| | | | | |
|---|---|---|---|---|
| DE | 102014014242 A1 * | 3/2016 | | B60W 30/06 |
| DE | 102014014242 A1 | 3/2016 | | |
| EP | 2196773 A1 | 6/2010 | | |
| JP | 2006-160194 A | 6/2006 | | |
| JP | 2008-096362 A | 4/2008 | | |
| JP | 2011-039600 A | 2/2011 | | |
| JP | 2014-004904 A | 1/2014 | | |
| KR | 20160114486 A | 10/2016 | | |
| WO | 2017/068698 A1 | 4/2017 | | |
| WO | 2017/068701 A1 | 4/2017 | | |

* cited by examiner

PARKING ASSISTANCE METHOD AND PARKING ASSISTANCE DEVICE

TECHNICAL FIELD

The present invention relates to a parking assistance method and a parking assistance device that search for empty parking spaces around a host vehicle, display assistance images indicating the positions of the empty parking spaces on a surrounding image of an area including the host vehicle viewed from above, and set a parking target based on the displayed assistance images.

BACKGROUND

In the related art, Japanese Patent Application Publication No. 2008-96362 has been disclosed as an in-vehicle navigation device for guiding to a parking space matching the preference of a user. The in-vehicle navigation device disclosed in Japanese Patent Application Publication No. 2008-96362 sets the priority order of parking spaces in a parking place, and when the parking space with the highest priority is not empty, the in-vehicle navigation device determines the parking space with the second highest priority as a recommended parking space.

SUMMARY

The above-described conventional in-vehicle navigation device is intended for a parking place in which parking spaces are visually demarcated clearly. However, in a parking place in which white lines are not marked clearly, it is impossible to display images indicating the positions of empty parking spaces since it is difficult to detect the parking spaces. For this reason, there has been conventionally a problem that it is impossible to set a parking target based on the images indicating the positions of the empty parking spaces and thus impossible to utilize the automated parking.

The present invention is proposed in light of the above-described circumstances, and an object of the present invention is to provide a parking assistance method and a device therefor that can display images indicating the positions of empty parking spaces and utilize parking assistance control even for a parking place in which parking spaces are not visually demarcated clearly.

In order to solve the above-described problem, a parking assistance method and a device therefor according to an aspect of the present invention detect empty parking spaces around a moving object and determine whether the detected empty parking spaces meet the display condition for displaying first assistance images indicating the positions of the empty parking spaces. In addition, the first assistance images are displayed in empty parking spaces not meeting the display condition when a currently set mode is an adjustable mode that allows an occupant of the moving object to manually adjust a parking target.

According to the present invention, it is possible to display images indicating the positions of empty parking spaces and utilize the automated parking although for a parking place in which parking spaces are not visually demarcated clearly.

DETAILED DESCRIPTION

An embodiment to which the present invention is applied is described below with reference to the drawings. In the descriptions of the drawings, the same portions are indicated by the same reference signs, and descriptions thereof are omitted.

[Configuration of Parking Assistance Device]

Figure 1:
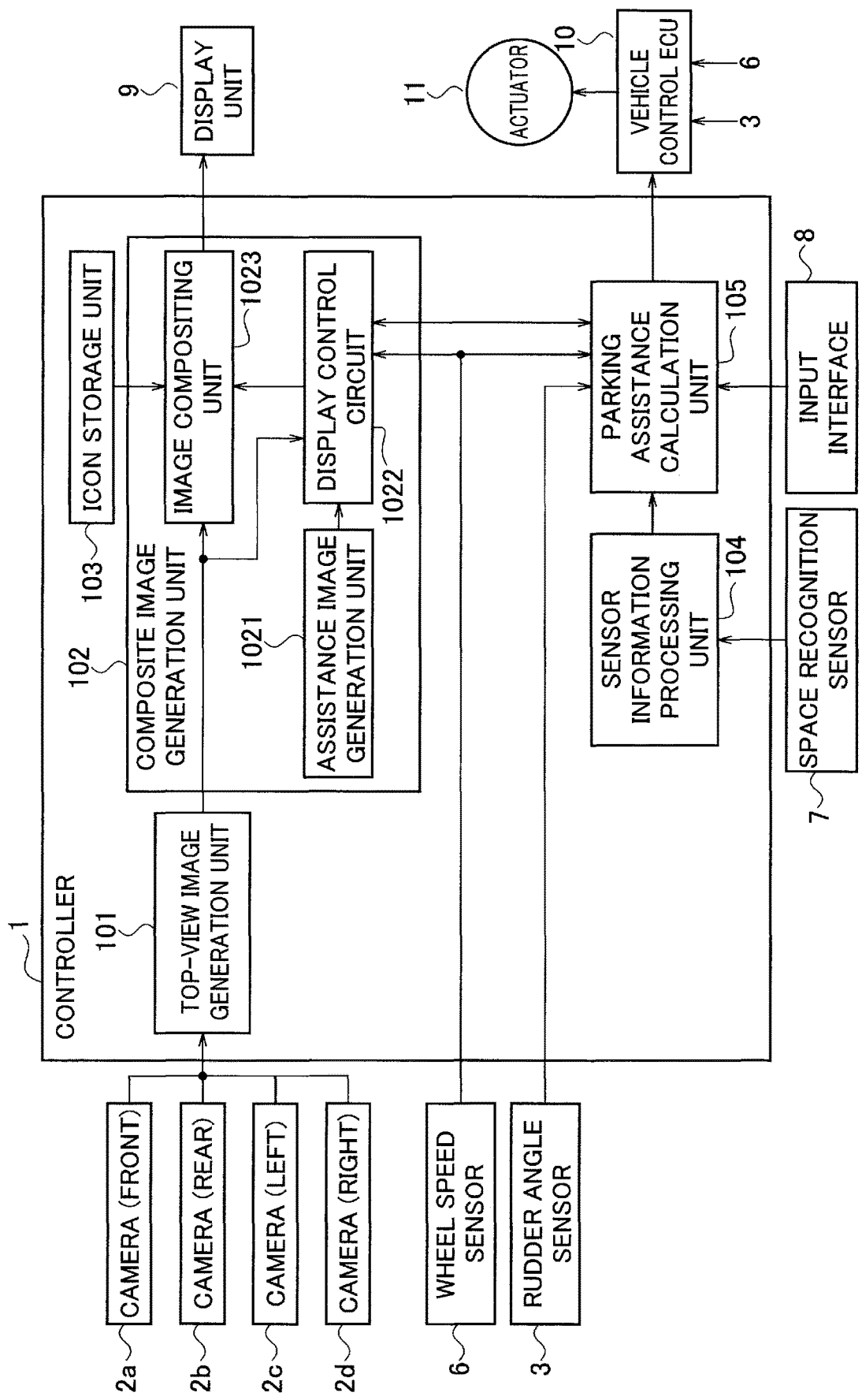
FIG. 1 is a block diagram illustrating a configuration of a parking assistance device according to an embodiment of the present invention.

FIG. 1 is a block diagram illustrating a configuration of a part of a vehicle mounted with a parking assistance device according to the embodiment of the present invention. The vehicle includes a controller 1, cameras 2a, 2b, 2c, and 2d, a rudder angle sensor 3, a wheel speed sensor 6, a space recognition sensor 7, an input interface 8, a display unit 9, a vehicle control ECU 10, and an actuator 11. In this embodiment, parking means to move to an empty parking space and stop in the empty parking space. For an automobile, parking means to move to an empty parking space so as to park the automobile in a parking space in a parking place, and to stop in the empty parking space. In this embodiment, parking assistance control includes control of displaying an empty parking space around the host vehicle as a parking target to the occupant, control of notifying the occupant of an operation method for parking to the parking target, control of executing the automated parking that automatically performs parking to the parking target, and so on.

The controller 1 includes a top-view image generation unit 101, a composite image generation unit 102, an icon storage unit 103, a sensor information processing unit 104, and a parking assistance calculation unit 105 as multiple information processing circuits. The composite image generation unit 102 includes an assistance image generation unit 1021, a display control circuit 1022, and an image compositing unit 1023.

The controller 1 includes the top-view image generation unit 101 and the composite image generation unit 102 constituting the parking assistance device, and the controller 1 can be implemented using a microcomputer including a CPU (a central processing unit), a memory, and an input and output unit. A computer program for functioning the microcomputer as an ECU is installed to the microcomputer to be executed. Thus, the microcomputer functions as the controller 1. Although an example described herein is that the controller 1 is implemented by software, it is needless to say that it is also possible to implement the controller 1 by preparing hardware dedicated for executing each information processing described below. The parking assistance control in this embodiment includes control of displaying an empty parking space around the host vehicle as a parking target space to the occupant, control of notifying the occupant of an operation method for parking to the parking target space, control of executing the automated parking that automatically performs parking to the parking target space, and so on.

The camera 2a is mounted on the front side of the vehicle to capture an image of an area ahead of the vehicle. The camera 2b is mounted on the rear side of the vehicle to capture an image of an area behind the vehicle. The camera 2c is mounted on the left side of the vehicle to capture an image of an area on the left of the vehicle. The camera 2d is mounted on the right side of the vehicle to capture an image of an area on the right of the vehicle. The cameras are each disposed below a roof of the vehicle.

Since each camera is disposed below the roof of the vehicle, it is difficult to display an image actually captured from above the vehicle. In other words, since the camera cannot capture an image of the vehicle, it is impossible to obtain an image of the actual vehicle. For this reason, the later-described vehicle icon (an imitation image of the vehicle) is used instead of the image of the actual vehicle.

The rudder angle sensor 3 detects a rudder angle (a steering angle) of the vehicle when the vehicle parks into an empty parking space (or until parking is completed). The wheel speed sensor 6 calculates a rotation speed (a wheel speed) of the wheels. A vehicle speed of the vehicle is detected based on the wheel speed.

The space recognition sensor 7 recognizes a space around the vehicle. The space recognition sensor 7 is a sensor for detecting an obstacle existing around the vehicle, and, for example, a laser rangefinder (an LRF) may be used. The LRF emits an infrared laser to a target object and measures the distance to the target object based on the intensity of the reflected light. The distance to the target object can be obtained as point cloud information through the measurement by the LRF, and the point cloud information is outputted to the sensor information processing unit 104. The space recognition sensor 7 may be only required to detect the distance to the target object and whether there is the target object; thus, as another example, it is also possible to use a clearance sonar using ultrasound waves, a monocular camera, and a stereo camera including a pair of cameras, for example.

The input interface 8 is a terminal through which the occupant of the vehicle inputs various pieces of information on parking, and various operation input device and the like mounted in the vehicle such as, for example, a joystick, an operation switch, and a touch panel provided to the display unit 9 can be used as the input interface 8.

For example, a liquid crystal display for navigation provided in a vehicle compartment and an existing monitor attached to a remote operation terminal can be used for the display unit 9.

Based on the images of the surroundings of the vehicle captured by the four cameras 2a to 2d, the top-view image generation unit 101 sets predetermined virtual viewpoint and projection plane and generates an image of viewing from above the vehicle to the bottom (in the vehicle direction). Since each camera cannot capture the image of the vehicle as described above, the thus-generated image does not include the vehicle. Hereinafter, this image is referred to as a "top-view image." The top-view image is, specifically, an image of the case of viewing the surroundings of the vehicle from above the vehicle. A method of generating the top-view image is an already known technique; thus, a detailed description is omitted. In this embodiment, the image is not necessarily required to be the top-view image as long as it is an image displaying the surroundings of the vehicle (a surrounding image) such as a bird's-eye-view image. The top-view image generation unit 101 may generate the top-view image (the surrounding image) by receiving images captured by a camera provided outside the vehicle or in a parking place and a camera in another vehicle through wireless communication. In this embodiment, the imitation image of the vehicle (the vehicle icon) is not necessarily required to be used when the image captured from above the vehicle is used.

The icon storage unit 103 stores the vehicle icon in advance. The vehicle icon is to be displayed in the position of the vehicle on the top-view image.

The composite image generation unit 102 generates a composite image by superimposing the icon and an assistance image on the top-view image. The units constituting the composite image generation unit 102 are described below.

The assistance image generation unit 1021 generates an assistance image for assisting parking. For example, the assistance image generation unit 1021 generates first assistance images indicating the positions of empty parking spaces and a second assistance image indicating that an empty parking space is detected in a position different from the positions of the empty spaces on the top-view image. The assistance image generation unit 1021 outputs the generated assistance image to the display control circuit 1022.

The display control circuit 1022 obtains the top-view image from the top-view image generation unit 101, searches for empty parking spaces around the host vehicle, and superimposes and displays the first assistance images in the positions of the found empty parking spaces. Accordingly, the first assistance images are images indicating the positions of the empty parking spaces. Once the occupant selects one of the displayed first assistance images through the input interface 8, the display control circuit 1022 sets the parking target space in the position of the empty parking space in which the first assistance image is displayed.

The display control circuit 1022 searches for empty parking spaces while performing image processing on the obtained top-view image and determines whether the found empty parking spaces meet the display condition for displaying the first assistance images. The method of determining whether the display condition is met includes obtaining the certainty factor for every empty parking spaces and determining whether the certainty factor is higher than a predetermined reference value.

The "certainty factor" of a parking space is a numerical value that indicates how much the parking space is likely an empty parking space. The certainty factor is calculated based on the position and the orientation of the empty parking space, the orientation and the position of the empty parking space with respect to a road adjacent thereto, the detection accuracy of frame lines of the empty parking space, and the like detected on the top-view image. The higher the detection accuracy of the frame lines such as white lines to be detected, the higher the certainty factor, and the lower the detection accuracy of the frame lines, the lower the certainty factor. For example, the certainty factor is low when the frame lines partitioning the parking space are detected partially, when a part of the frame lines cannot be detected because of covering by an obstacle such as another vehicle, or when the entirety or a part of the frame lines cannot be recognized because of blown highlights or crushed shadows of the image.

The display control circuit 1022 determines that the display condition for displaying the first assistance image is met when the certainty factor is higher than the predetermined reference value, and determines that the display condition for displaying the first assistance image is not met when the certainty factor is equal to or lower than the predetermined reference value. Consequently, the first assistance image is superimposed and displayed in the position of the empty parking space that is determined to meet the display condition. In the determination whether the display condition is met performed by the display control circuit 1022, it is not necessarily required to use the certainty factor, and, for example, it may be determined that the display condition is met when there is an empty parking space that allows easy parking, which is determined based on ease of parking into the empty parking space (the length of parking time, parking route, and the like). In addition, it may also be determined that the display condition is met when the size of the empty parking space is greater than a predetermined size, when the distance between the empty parking space and the host vehicle is shorter than a predetermined distance, when at night the distance between the empty parking space and a street light is shorter than a predetermined distance, and the like.

Figure 2:
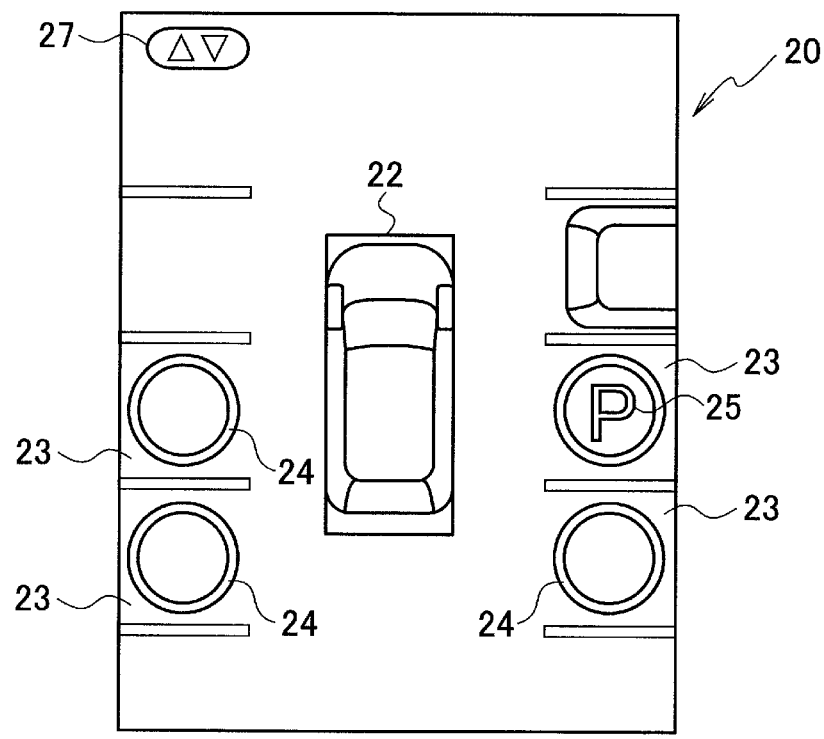
FIG. 2 is a diagram illustrating an example of first assistance images displayed by the parking assistance device according to the embodiment of the present invention.

Now, a method of displaying the first assistance image by the display control circuit 1022 is described with reference to FIG. 2. FIG. 2 is a scene in which the host vehicle searches for empty parking spaces, and the speed of the host vehicle 22 is 0 km/h. As illustrated in FIG. 2, when parking spaces 23 are detected as empty parking spaces with high certainty factor in a surrounding image 20, a first assistance image 25 is superimposed and displayed in the position of a parking space recommended the most. A method of determining the recommended parking space is set in advance and is, for example, to recommend a parking space close to a driver seat. First assistance images 24 are superimposed and displayed in the positions of other empty parking spaces with high certainty factor.

The first assistance images 24 and 25 may be displayed when the vehicle is stopped. If the host vehicle 22 is moved when the processing of superimposing the first assistance images 24 and 25 on the empty parking spaces 23 is performed, the empty parking spaces 23 in the top-view image 20 recognized by the display control circuit 1022 are also moved. In other words, when the display control circuit 1022 recognizes the empty parking spaces 23 and the first assistance images 24 and 25 are about to be superimposed on the recognized empty parking spaces 23, the next moment the recognized empty parking spaces 23 are moved. Thus, there is a time lag occurs between when the display control circuit 1022 recognizes the empty parking spaces 23 and when the first assistance images 24 and 25 are superimposed on the recognized empty parking spaces 23. Due to this time lag, there is a risk that the positions of the empty parking spaces 23 and the positions of the first assistance images 24 and 25 may be displaced from each other. That is, when the display control circuit 1022 superimposes the first assistance images 24 and 25 on the empty parking spaces 23 in the top-view image 20 while the host vehicle 22 is traveling, there is a risk that the first assistance images 24 and 25 cannot be superimposed on proper positions. Such displacements become greater as the speed of the host vehicle 22 is higher.

Figure 3:
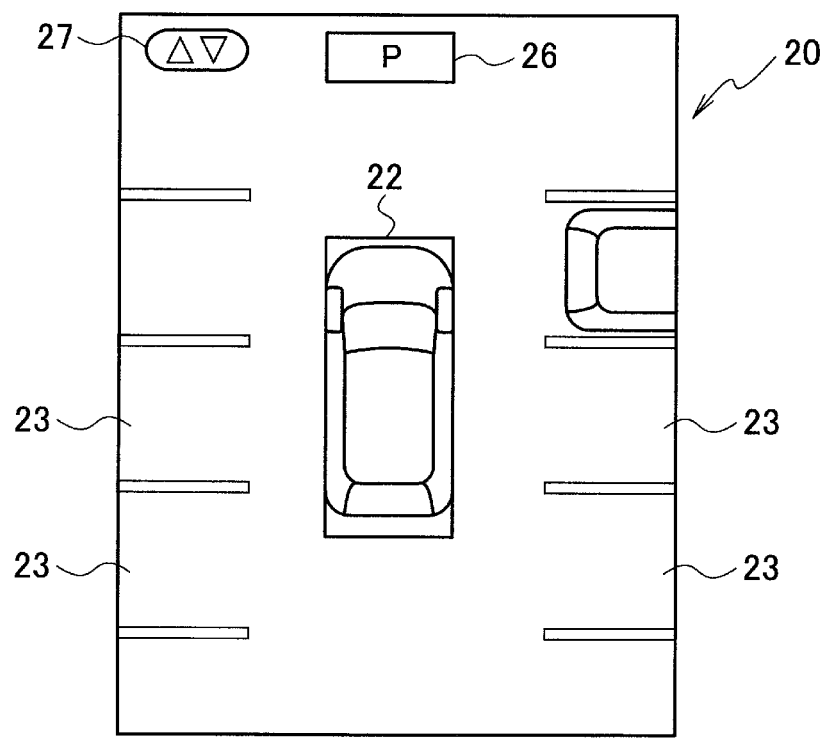
FIG. 3 is a diagram illustrating an example of a second assistance image displayed by the parking assistance device according to the embodiment of the present invention.

In view of this, while the vehicle is traveling to search for empty parking spaces, a second assistance image 26 indicating that empty parking spaces are detected is displayed, and the first assistance images 24 and 25 are deleted, as illustrated in FIG. 3. When empty parking spaces around the host vehicle are detected while the host vehicle 22 is not being stopped, the second assistance image 26 is displayed in a certain position different from the positions of the empty parking spaces in the surrounding image 20. For example, in FIG. 3, the second assistance image 26 is displayed in the upper center of the surrounding image 20. Accordingly, the second assistance image 26 does not indicate the positions of the detected empty parking spaces but indicates only whether there are the empty parking spaces.

Thus, since the second assistance image 26 is displayed in a position different from that of the empty parking spaces 23 while the host vehicle 22 is traveling, the occupant can recognize whether there are the empty parking spaces 23 easily by checking the second assistance image 26. Once the vehicle is stopped while the second assistance image 26 is being displayed, the second assistance image 26 is deleted, and the display is switched to the first assistance images 24 and 25 as illustrated in FIG. 2. It should be noted that the second assistance image 26 may not be deleted and may be displayed with a less noticeable color such as gray.

Figure 4:
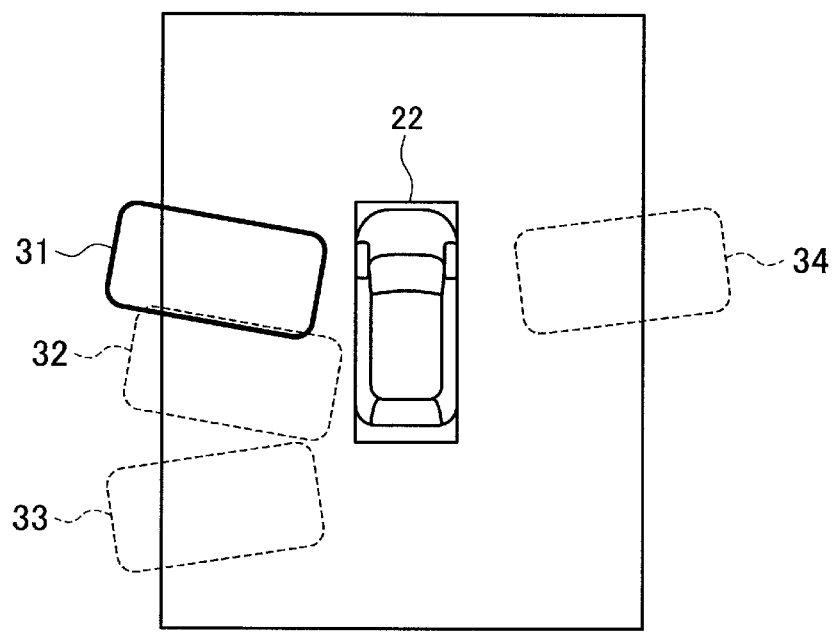
FIG. 4 is a diagram for describing a method of displaying the first assistance images in empty parking spaces not meeting the display condition by the parking assistance device according to the embodiment of the present invention.

On the other hand, when an adjustment mode is being set, the display control circuit 1022 displays the first assistance images also for empty parking spaces in which no first assistance images 24 and 25 are displayed since that do not meet the display condition. The adjustment mode is a mode in which the occupant of the host vehicle can adjust the parking target manually, and the first assistance images displayed in this mode are first assistance images 31 to 34 having different shapes from that of the first assistance images 24 and 25, as illustrated in FIG. 4. In FIG. 4, the first assistance image 31 is displayed and emphasized with a solid line in the position of the most recommended empty parking space among the empty parking spaces not meeting the display condition. An empty parking space having a condition closest to the display condition is set as the most recommended empty parking space, and, for example, an empty parking space with the highest certainty factor among the empty parking spaces with certainty factor equal to or lower than the predetermined reference value is set as the most recommended empty parking space. The first assistance images 32 to 34 are displayed with dotted lines in positions other than that of the most recommended empty parking space.

In addition, when no empty parking spaces are detected through searching, the display control circuit 1022 may also execute control to allow the occupant of the host vehicle to set the first assistance images manually.

The image compositing unit 1023 obtains the top-view image generated by the top-view image generation unit 101 and reads the vehicle icon from the icon storage unit 103.

The image compositing unit 1023 obtains the first assistance images and the second assistance image from the display control circuit 1022.

The image compositing unit 1023 generates a composite image by superimposing the vehicle icon in the position of the vehicle in the top-view image. In addition, the image compositing unit 1023 displays the first assistance images and the second assistance image in response to the control by the display control circuit 1022. The composite image is then displayed on the display unit 9 as the surrounding image.

Based on the result detected by the space recognition sensor 7, the sensor information processing unit 104 estimates a traveling route on which the vehicle travels, estimates a parking area existing around the traveling route, and based on the traveling route information and the parking area information, the sensor information processing unit 104 estimates a region in which the vehicle can travels.

The parking assistance calculation unit 105 obtains the information inputted to the input interface 8, the data obtained by the sensor information processing unit 104, the rudder angle detected by the rudder angle sensor 3, and the vehicle speed detected by the wheel speed sensor 6. Based on these pieces of information, the parking assistance calculation unit 105 calculates a vehicle speed target value for parking into the parking target and a vehicle control signal and outputs the vehicle control signal to the vehicle control ECU 10. Based on the data obtained by the sensor information processing unit 104 and the rudder angle and the vehicle speed, the parking assistance calculation unit 105 calculates a target parking route to the parking target and executes steering control, acceleration and deceleration control, position control, and vehicle speed control such that the current position of the vehicle moves along the target parking route.

Based on the vehicle control signal, the rudder angle, and the vehicle speed, the vehicle control ECU 10 controls driving of the actuator 11 during driving and braking and steering of the vehicle. The automated driving in this embodiment means, for example, a state in which at least one of actuators for braking (braking), acceleration (driving), and steering (steering) is controlled without manipulation by the driver. As long as at least one actuator is controlled, it does not matter that the rest of the actuators are operated by manipulation by the driver. The manual driving in this embodiment means a state in which the driver manipulates the operations required for traveling such as, for example, braking, acceleration, and steering.

The vehicle control ECU 10 can further reduce manipulation load of the driver during the parking operation by executing the automated driving such that the vehicle moves along the target route set by the parking assistance calculation unit 105.

The controller 1 includes general-purpose electronic circuits including the microcomputer, a microprocessor, and a CPU and a peripheral device such as a memory. Once a specific program is executed, the controller 1 operates as the above-described top-view image generation unit 101, the composite image generation unit 102, the sensor information processing unit 104, and the parking assistance calculation unit 105. In addition, the controller 1 operates as the assistance image generation unit 1021, the display control circuit 1022, and the image compositing unit 1023. Each function of such a controller 1 can be implemented by one or more processing circuits. The processing circuits include a programmed processing device such as, for example, a processing device including an electric circuit, and the processing circuits also include a device such as an application specific integrated circuits (ASIC) arranged to execute the functions described in this embodiment and a conventional type circuit part.

[Procedure of Parking Target Setting Processing]

Figure 5A:
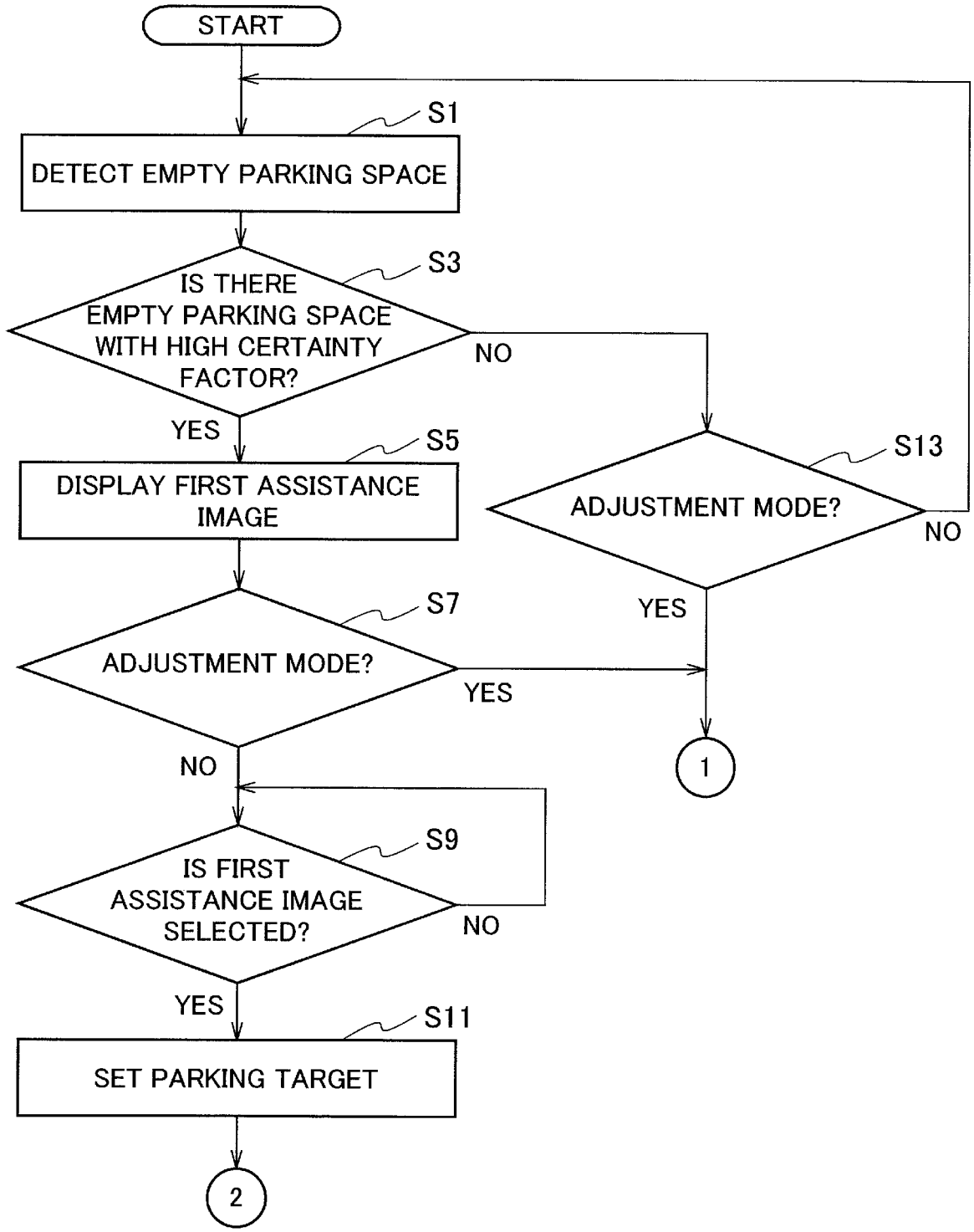
FIG. 5A is a flowchart indicating a processing procedure of parking target setting processing by the parking assistance device according to the embodiment of the present invention.
Figure 5B:
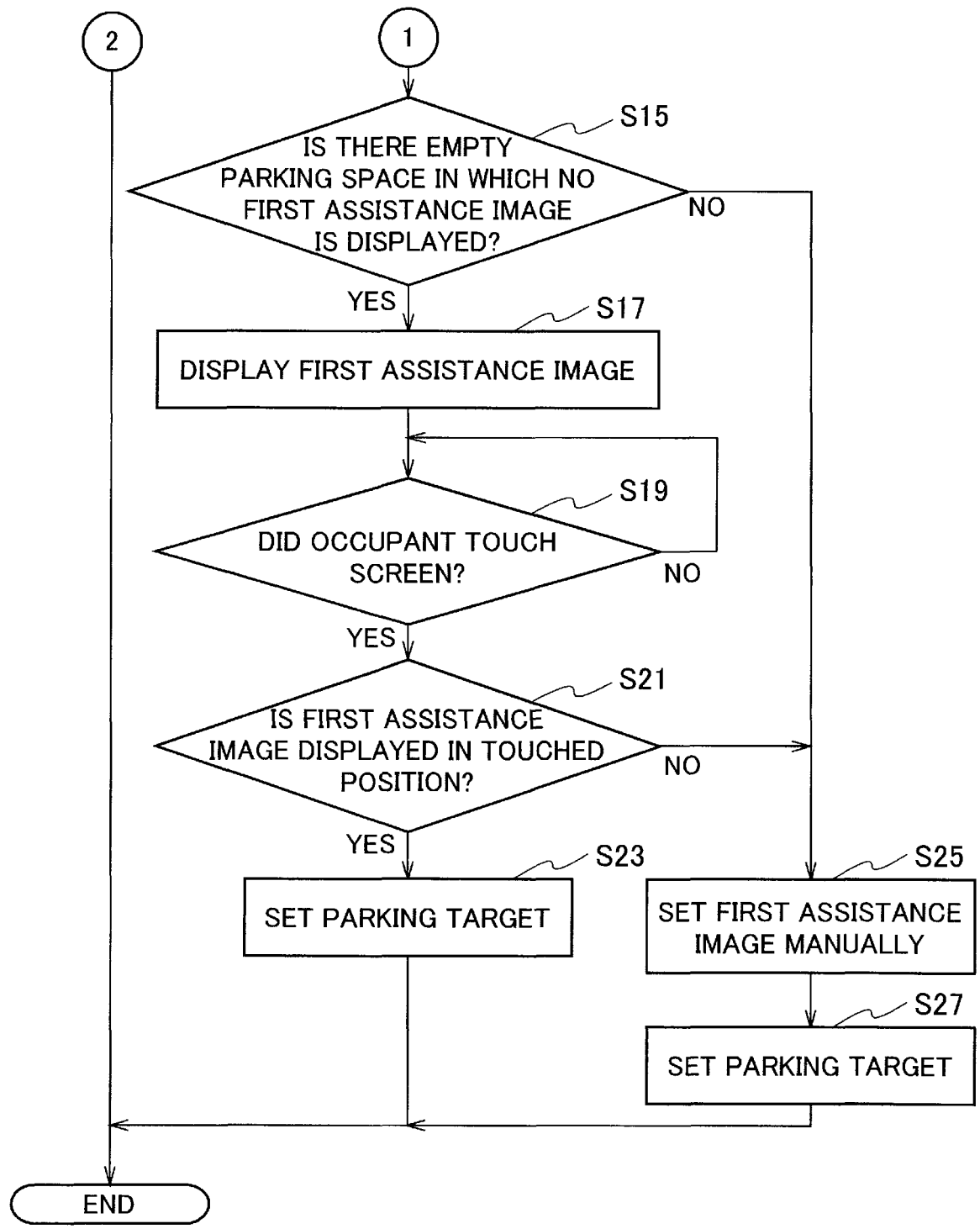
FIG. 5B is a flowchart indicating the processing procedure of the parking target setting processing by the parking assistance device according to the embodiment of the present invention.

Next, the procedure of the parking target setting processing by the parking assistance device according to this embodiment is described with reference to the flowcharts of FIGS. 5A and 5B. The parking target setting processing illustrated in FIG. 5 starts once the automated parking is started.

As illustrated in FIG. 5, first, in step S1, once the automated parking is started, the display control circuit 1022 searches for empty parking spaces around the host vehicle during traveling and detects the empty parking spaces.

In step S3, the display control circuit 1022 determines whether the empty parking spaces detected in step S1 meet the display condition for displaying the first assistance image. Specifically, the display control circuit 1022 calculates the certainty factor of each of the detected empty parking spaces and determines whether there are empty parking spaces with the certainty factor higher than the predetermined reference value. When there are the empty parking spaces with the certainty factor higher than the predetermined reference value, the process proceeds to step S5, and when there are no empty parking spaces with the certainty factor higher than the predetermined reference value, the process proceeds to step S13.

First, the case where there are the empty parking spaces with the certainty factor higher than the predetermined reference value is described. In step S5, the display control circuit 1022 displays the first assistance images in the positions of the empty parking spaces with high certainty factor. For example, as illustrated in FIG. 2, when the parking spaces 23 are detected as the empty parking spaces with high certainty factor, the first assistance image 25 is displayed in the most recommended parking space. The method of determining the recommended parking space is set in advance and is, for example, to recommend a parking space close to the driver seat. The first assistance images 24 are displayed in the other empty parking spaces with high certainty factor.

Figure 6:
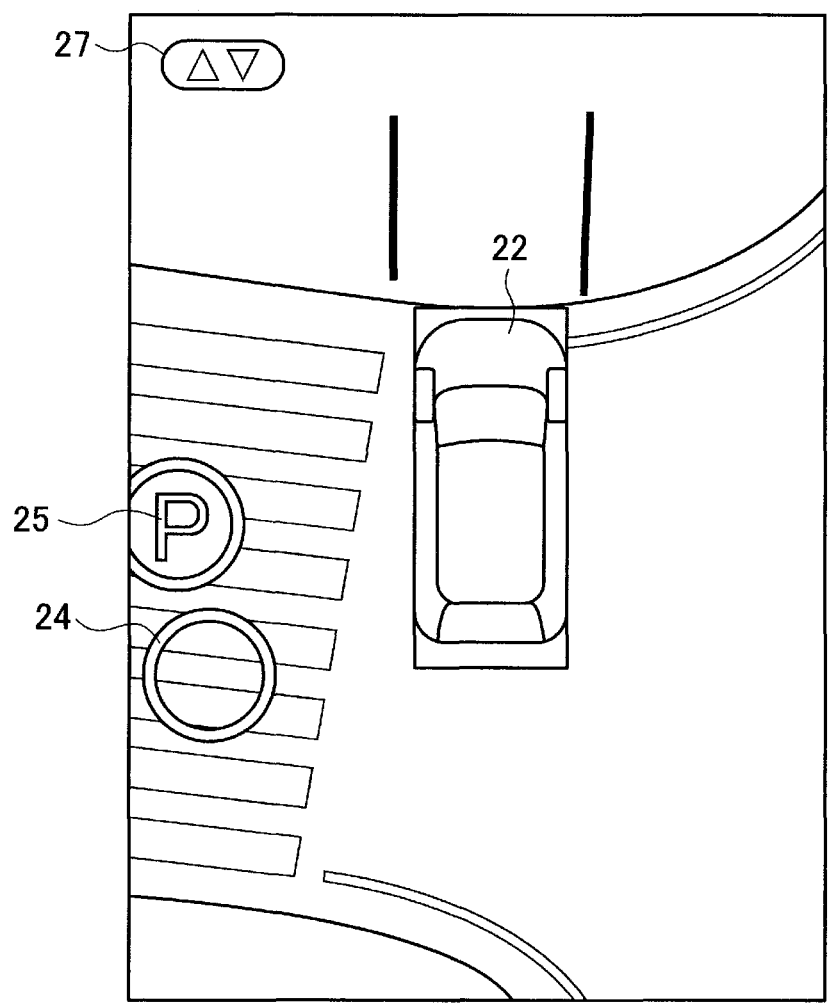
FIG. 6 is a diagram illustrating an example of an error display that occurs in a place in which parking spaces are not visually demarcated clearly.

It is possible to prevent an error display of the first assistance images by displaying the first assistance images in only the empty parking spaces with high certainty factor as described above. For example, as illustrated in FIG. 6, when the first assistance images are displayed in empty parking spaces with low certainty factor in a place where the parking spaces are not visually demarcated clearly, the first assistance images 24 and 25 are displayed in error on a pedestrian crossing. Besides, the first assistance images may be displayed in error in parking spaces in which a parking mark for the disabled is displayed for each. To address this, the first assistance images are displayed in only the empty parking spaces with high certainty factor, and thus the above-described error displays can be prevented.

In step S7, the display control circuit 1022 determines whether the adjustment mode is being set. The adjustment mode is a mode in which the occupant of the vehicle can manually adjust the parking target, and the adjustment mode can be set by touching an adjustment button 27 displayed on the surrounding image in FIG. 2. When the adjustment mode is not being set, the process proceeds to step S9, and when the adjustment mode is being set, the process proceeds to step S15.

In step S9, the display control circuit 1022 determines whether the occupant of the vehicle selects either of the first assistance images 24 and 25 displayed on the surrounding image by touching. When neither is selected, the display control circuit 1022 continuously determines whether the selection is performed, and when the occupant selects either of the first assistance images, the process proceeds to step S11.

In step S11, the display control circuit 1022 sets the empty parking space in the position of the first assistance image selected by the occupant as the parking target. Once the parking target is thus set, the display control circuit 1022 ends the parking target setting processing according to this embodiment. Thereafter, the parking assistance calculation unit 105 starts the automated parking to the set parking target.

Next, the case where there are no empty parking spaces with the certainty factor higher than the predetermined reference value is described. In step S13, the display control circuit 1022 determines whether the adjustment mode is being set. When the adjustment button 27 in FIG. 2 is touched and the adjustment mode is being set, the process proceeds to step S15, and when the adjustment mode is not being set, the process returns to step S1.

In step S15, the display control circuit 1022 determines whether there are empty parking spaces in which the first assistance images are not displayed because the display condition is not met. Although there are empty parking spaces detected in step S1, the first assistance images are not displayed therein if the certainty factor thereof is equal to or lower than the predetermined reference value in step S3. Thus, it is determined whether there are empty parking spaces with the certainty factor equal to or lower than the predetermined reference value and the first assistance images are not displayed therein. Then, when there are the empty parking spaces with the certainty factor equal to or lower than the predetermined reference value, the process proceeds to step S17, and when there are no empty parking spaces with the certainty factor equal to or lower than the predetermined reference value, the process proceeds to step S25.

In step S17, the display control circuit 1022 superimposes and displays the first assistance images in the positions of the empty parking spaces in which the first assistance images are not displayed because the display condition is not met, or the empty parking spaces with the certainty factor equal to or lower than the predetermined reference value. For example, the first assistance images 31 to 34 are displayed as illustrated in FIG. 4. The first assistance images 31 to 34 each have a rectangular shape indicating the position of an outer frame of a parking space, which is different from the shape of each of the first assistance images 24 and 25 in FIG. 2 displayed in step S5. Among the first assistance images 31 to 34, the first assistance image 31 is displayed in the most recommended empty parking space out of the empty parking spaces not meeting the display condition, and the first assistance image 31 is displayed with solid lines and, additionally, displayed with a conspicuous color such as red to be emphasized. For example, an empty parking space closest to the driver seat may be set as the recommended empty parking space, or an empty parking space having a condition closest to the display condition, or an empty parking space with the highest certainty factor among the empty parking spaces with the certainty factor equal to or lower than the predetermined reference value, may be set as the recommended empty parking space. Meanwhile, the first assistance images 32 to 34 are displayed in positions of empty parking spaces other than the most recommended empty parking space and are displayed with dotted lines.

As described above, it is possible to set the parking target by displaying the first assistance images in the positions of the empty parking spaces in which the first assistance images are not displayed because of the low certainty factor and selecting one of the displayed first assistance images. This makes it possible to use a parking place in which parking spaces are not visually demarcated clearly.

When the first assistance images are displayed in the empty parking spaces with low certainty factor, white lines of a pedestrian crossing may be detected in error as white lines of empty parking spaces and an error display may be made as illustrated in FIG. 6. However, since the first assistance images are displayed in the empty parking spaces with low certainty factor only in the adjustment mode in this embodiment, the occupant of the vehicle can easily recognize the difference between the empty parking spaces with low certainty factor and the empty parking spaces with high certainty factor.

In addition, since the shapes of the first assistance images 24 and 25 displayed in the empty parking spaces with high certainty factor are different from the shapes of the first assistance images 31 to 34 displayed in the empty parking spaces with low certainty factor, the occupant can easily recognize the difference of the certainty factor between the empty parking spaces. Specifically, when the process proceeds from step S7 to step S17, the first assistance images 24 and 25 displayed in the empty parking spaces with high certainty factor and the first assistance images 31 to 34 displayed in the empty parking spaces with low certainty factor are displayed concurrently. Consequently, the occupant can easily recognize the difference of the certainty factor between the empty parking spaces.

In step S19, the display control circuit 1022 determines whether the occupant touches the display screen illustrated in FIG. 4, and when the occupant does not touch the display screen, the display control circuit 1022 continuously determines whether the touching is performed. Once the occupant touches the display screen, the process proceeds to step S21.

Figure 7:
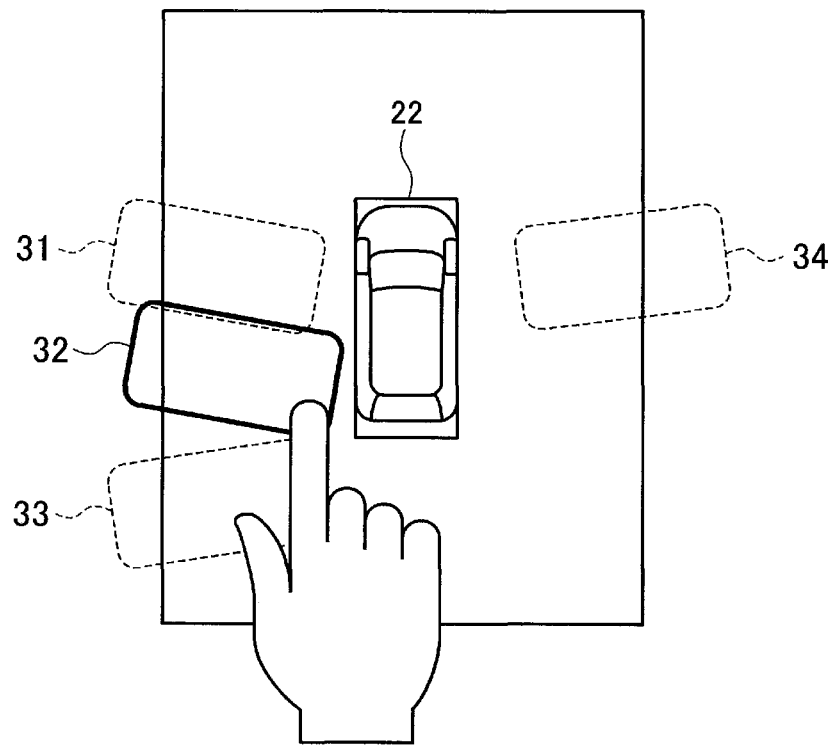
FIG. 7 is a diagram for describing a method of displaying the first assistance images in the empty parking spaces not meeting the display condition and setting the parking target by the parking assistance device according to the embodiment of the present invention.

In step S21, the display control circuit 1022 determines whether the first assistance image is displayed in the position on the screen image touched by the occupant in step S19. As illustrated in FIG. 7, when the first assistance image is displayed in the position touched by the occupant, the process proceeds to step S23, and when the first assistance image is not displayed in the position touched by the occupant, the process proceeds to step S25.

In step S23, the display control circuit 1022 sets the empty parking space in the position of the first assistance image selected by the occupant as the parking target. For example, in the case of FIG. 7, the position of the first assistance image 32 is set as the parking target. The parking target is displayed with solid lines and, additionally, displayed with a conspicuous color such as red to be emphasized. Once the parking target is thus set, the display control circuit 1022 ends the parking target setting processing according to this embodiment. Thereafter, the parking assistance calculation unit 105 starts the automated parking to the set parking target.

Figure 8:
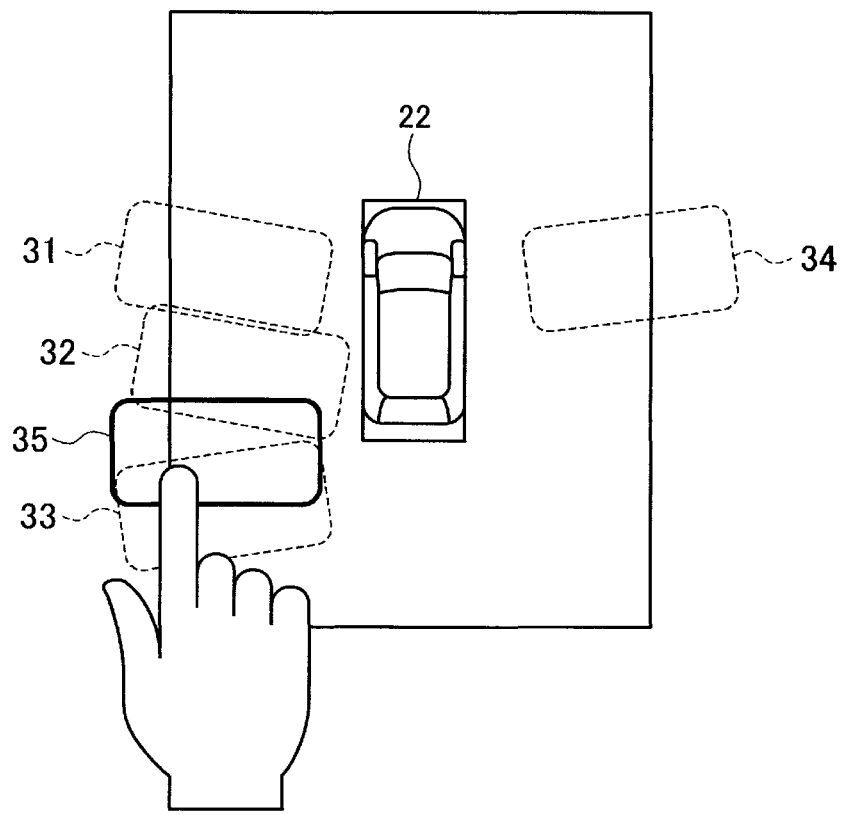
FIG. 8 is a diagram for describing a method of displaying the first assistance images manually by an occupant of a vehicle and setting the parking target by the parking assistance device according to the embodiment of the present invention.

Next, the case where the first assistance image is manually set by the occupant of the vehicle is described. When there are no empty parking spaces in which the first assistance images are not displayed because the certainty factor is equal to or lower than the predetermined reference value in step S15, the occupant of the vehicle sets the first assistance image manually in step S25. This case is the case where no empty parking spaces are detected through searching, because there are no empty parking spaces with the certainty factor higher than the reference value in step S3 and also there are no empty parking spaces with the certainty factor equal to or lower than the reference value in step S15. Also in the case where the first assistance image is not displayed in the position on the display screen touched by the occupant in step S21, the occupant of the vehicle sets the first assistance image manually in step S25. In step S25, the display control circuit 1022 sets a first assistance image 35 in the position touched by the occupant as illustrated in FIG. 8. The first assistance image 35 is displayed with solid lines, and additionally, displayed with a conspicuous color such as red to be emphasized.

In step S27, the display control circuit 1022 sets the position of the first assistance image set by the occupant as the parking target. For example, in the case of FIG. 8, the position of the first assistance image 35 is set as the parking target. Once the parking target is thus set, the display control circuit 1022 ends the parking target setting processing according to this embodiment.

Thereafter, the parking assistance calculation unit 105 starts the automated parking to the set parking target. The parking assistance calculation unit 105 sets the target route for the vehicle to move from the initial position to the target parking position and sets also the target vehicle speed and the target rudder angle for the vehicle to move along the target route. Then, the parking assistance calculation unit 105 calculates an amount of displacement between the current position of the vehicle and a position of the vehicle on the target route, calculates an amount of correction to reduce the amount of displacement, and moves the vehicle to the target parking position while correcting the target vehicle speed and the target rudder angle. The parking assistance calculation unit 105 can thus allow the host vehicle to park in the target parking position. This makes it possible to park the host vehicle utilizing the automated parking although in a parking place in which parking spaces are not visually demarcated clearly.

In this embodiment, the parking assistance device is mounted in the target vehicle that displays the assistance images. However, the similar parking assistance method may be performed remotely by mounting a communicable server device in the target vehicle or mounting the parking assistance device in a vehicle other than the target vehicle, and transmitting and receiving required information and instructions through the communication between the server device or the other vehicle and the target vehicle. The communication between the server device and the target vehicle can be executed through wireless communication or road-to-vehicle communication. The communication between the other vehicle and the target vehicle can be executed through so-called vehicle-to-vehicle communication.

In this embodiment, the top-view image is used; however, for example, a bird's-eye-view image, or an image viewed obliquely from above the vehicle, may be used instead of the top-view image. In other words, as long as the image is a surrounding image of the surroundings around the vehicle viewed from above, it is not limited to the top-view image and may be the bird's-eye-view image. For the vehicle icon used in this case, a three-dimensional vehicle icon of the vehicle viewed obliquely from above the vehicle may be used. In order to display the three-dimensional vehicle icon, three-dimensional data of the vehicle icon may be held, and a vehicle icon (two-dimensional data) may be generated to be displayed based on the three-dimensional data depending on the viewpoint. The surrounding image in this embodiment is not necessarily captured by the camera provided in the vehicle, and an image captured by a camera provided around a parking space may be used.

In this embodiment, this embodiment can be applied to anything as long as it is a moving object, not limited to an automobile. Specifically, this embodiment can be also applied to an industrial vehicle (for example, a truck), an airplane, a flying object, an underwater moving object (for example, a deep-sea probe and a submarine), an inverted pendulum machine, a cleaning robot, and the like. In the case of an airplane, a flying object, or an underwater moving object, when the airplane, the flying object, or the underwater moving object moves to an empty space and stops instead of the case of parking in the above-described embodiment, control may be performed to display the assistance image in the empty space. The application may be similarly made for the case of an inverted pendulum machine or a cleaning robot as well.

In this embodiment, the display for displaying the assistance images and the surrounding image to the occupant may not be necessarily disposed in a vehicle (a moving object), and it may be anything as long as it displays an image, such as a cell phone and a smart device.

[Effect of Embodiment]

As described above in detail, in the parking assistance method according to this embodiment, it is determined whether the detected empty parking spaces meet the display condition for displaying the first assistance images. The first assistance images are displayed in the empty parking spaces not meeting the display condition when the currently set mode is an adjustable mode that allows the occupant of the host vehicle to manually adjust the parking target. This makes it possible to utilize even the parking spaces not meeting the predetermined display condition by displaying the first assistance images indicating the positions of the empty parking spaces.

In addition, in the parking assistance method according to this embodiment, when there are no empty parking spaces meeting the display condition, the first assistance image is displayed in an empty parking space having a condition closest to the display condition. This makes it possible to allow the occupant to recognize easily the most recommended empty parking space among the empty parking spaces not meeting the display condition.

Moreover, in the parking assistance method according to this embodiment, when no empty parking spaces is detected, the occupant of the host vehicle sets the first assistance image manually in the adjustable mode. This makes it possible to utilize the automated parking by setting the first assistance image and setting the parking target manually even when no empty parking spaces can be detected.

Furthermore, in the parking assistance method according to this embodiment, when empty parking spaces around the host vehicle are detected while the host vehicle is not being stopped, the second assistance image indicating that the empty parking spaces are detected is displayed in a position different from the positions of the empty parking spaces on the surrounding image. This makes it possible to allow the occupant to recognize whether there are empty parking spaces easily while the host vehicle is traveling and searching for empty parking spaces.

In addition, in the parking assistance method according to this embodiment, when the host vehicle is stopped while the second assistance image is being displayed, the second assistance image is switched to the first assistance images. This makes it possible to allow the occupant to recognize the positions of the empty parking spaces existing around the host vehicle easily.

Moreover, in the parking assistance method according to this embodiment, when empty parking spaces around the vehicle are detected, the parking target for parking the vehicle by the automated parking is set by using the first assistance images. This makes it possible to utilize the automated parking by displaying the first assistance images indicating the positions of empty parking spaces when the parking assistance is executed.

Furthermore, the parking assistance method according to this embodiment may also be applied to a parking assistance device and a parking assistance method that can execute the automated parking control including real-time correction. The real-time correction is control for correcting the parking target to move the vehicle closer to the parking target during the process of executing the parking control. For example, in the case of parking into an empty parking space not meeting the display condition at the time point when the parking target is set (for example, an empty parking space with low certainty factor (when there is long distance between the parking target and the vehicle, when the environment of the parking place is bad (for example, it is raining or at night), or when the empty parking space is surrounded by parked vehicles or obstacles (for example, poles or walls of the parking place)), a position extremely different from the parking target set at first during the parking process may be detected as the parking target. This may cause the target value to be changed rapidly, the deviation between the target value and the current value to be increased rapidly, and the amount of control to be increased rapidly, and thus the behavior of the vehicle may be unstable, in the parking control for an empty parking space with low certainty factor.

To address this, during the process of executing the parking control for a parking space, when the real-time correction is executable, the target correction amount for the parking target in the real-time correction in the case of executing the parking control for the empty parking space not meeting the display condition is made smaller than that in the case of executing the parking control for the empty parking space meeting the display condition. This makes it possible to suppress the real-time correction in the empty parking space not meeting the display condition in which the parking target of the parking control may be rapidly changed, and thus it is possible to prevent the vehicle from having an unstable behavior.

Otherwise, during the process of executing the parking control for a parking space, when the real-time correction is executable, the real-time correction is prohibited in the case of executing the parking control for the empty parking space not meeting the display condition. This makes it possible to prohibit the real-time correction for the empty parking space not meeting the display condition in which the parking target of the parking control may be rapidly changed, and thus it is possible to prevent the vehicle from having an unstable behavior. Although there is no description in this embodiment, the real-time correction is a technique similar to the real-time correction in a control technique.

The above-described embodiment is an example of the present invention. Therefore, the present invention is not limited to the above-described embodiment, and it is needless to say that various changes depending on designs and the like are possible for even a mode other than the above embodiment without departing from the technical idea according to the present invention.

REFERENCE SIGNS LIST 1 controller
2a to 2d camera
3 rudder angle sensor
6 wheel speed sensor
7 space recognition sensor
8 input interface
9 display unit
10 vehicle control ECU
11 actuator
101 top-view image generation unit
102 composite image generation unit
103 icon storage unit
104 sensor information processing unit
105 parking assistance calculation unit
1021 assistance image generation unit
1022 display control circuit
1023 image compositing unit

The invention claimed is:

1. A parking assistance method of a parking assistance device that detects an empty parking space around a moving object, displays a first assistance image indicating a position of the detected empty parking space on a surrounding image viewed from above the moving object, and sets a parking target using the displayed first assistance image, comprising: determining whether the detected empty parking space meets a display condition for displaying the first assistance image; and displaying the first assistance image in the detected empty parking space not meeting the display condition when a currently set mode is an adjustable mode that allows an occupant of the moving object to manually adjust the parking target, wherein a display form of the first assistance image displayed in the detected empty parking space having a condition close to the display condition out of the empty parking spaces not meeting the display condition is different from a display form of the first assistance image displayed in the detected empty parking space having a condition distant from the display condition.

2. The parking assistance method according to claim 1, wherein when there is no empty parking space meeting the display condition, the first assistance image is displayed in the empty parking space having a condition closest to the display condition.

3. The parking assistance method according to claim 1, wherein
when no empty parking space is detected, the occupant of the moving object sets the first assistance image manually in the adjustable mode.

4. The parking assistance method according to claim 1, further comprising: when the empty parking space around the moving object is detected while the moving object is not being stopped, displaying a second assistance image indicating that the empty parking space is detected in a position different from the position of the empty parking space on the surrounding image.

5. The parking assistance method according to claim 4, wherein
when the moving object is stopped while the second assistance image is being displayed, the second assistance image is switched to the first assistance image.

6. The parking assistance method according to claim 1, wherein when the empty parking space around the moving object is detected, the parking target for parking the moving object by automated parking is set by using the first assistance image.

7. The parking assistance method according to claim 1, wherein during a process of executing parking control for the empty parking space, when real-time correction for correcting the parking target of the parking control is executable, a target correction amount for the parking target in the real-time correction in a case of executing parking control for the empty parking space not meeting the display condition is made smaller than that in a case of executing parking control for the empty parking space meeting the display condition.

8. The parking assistance method according to claim 1, wherein during a process of executing parking control for the empty parking space, when real-time correction for correcting the parking target of the parking control is executable, the real-time correction is prohibited in a case of executing parking control for the empty parking space not meeting the display condition.

9. A parking assistance device that detects an empty parking space around a moving object, displays a first assistance image indicating a position of the detected empty parking space on a surrounding image viewed from above the moving object, and sets a parking target using the displayed first assistance image, comprising: a display control circuit that determines whether the detected empty parking space meets a display condition for displaying the first assistance image, and displays the first assistance image in the detected empty parking space not meeting the display condition when a currently set mode is an adjustable mode that allows an occupant of the moving object to manually adjust the parking target, wherein the display control circuit displays the first assistance image such that a display form of the first assistance image displayed in the detected empty parking space having a condition close to the display condition out of the empty parking spaces not meeting the display condition is different from a display form of the first assistance image displayed in the detected empty parking space having a condition distant from the display condition.

* * * * *